United States Patent Office 2,892,833
Patented June 30, 1959

2,892,833

5α-HYDROXY-6β-METHYL-16α-17α-EPOXYPREGNANE-3,20-DIONE AND INTERMEDIATES FOR ITS PREPARATION

Luis E. Miramontes and Miguel A. Romero, Mexico City, Mexico, assignors to G. D. Searle & Co., Chicago, Ill., a corporation of Delaware No Drawing. Application January 28, 1959
Serial No. 789,527

6 Claims. (Cl. 260—239.55)

The present invention relates to novel intermediates for the preparation of 6-methyl steroids such as the progestationally active esters of 6α-methyl-17α-hydroxy-4-pregnene-3,20-dione. More particularly it relates to the preparation of 5α-hydroxy-6β-methyl-16α,17α-epoxypregnane-3,20-dione and intermediates for its preparation.

The enhancement of progestational activity by insertion of the 6-methyl group in such compounds as 17α-acetoxy-4-pregnene-3,20-dione makes it desirable to obtain these compounds from economic starting materials. The present invention provides a procedure using as a starting material the inexpensive lower alkanoic acid esters of 3β-hydroxy-5-androsten-17-one. These esters can be converted in good yields by a relatively short route to the desired progestational agents. Specifically, a 3β-alkanoyloxy-5-androsten-17-one is treated with hydrogen cyanide to yield the isomeric 3β-alkanoyloxy-17-cyano-17-hydroxy-5-androstenes which are then dehydrated, typically with phosphorous oxychloride, to yield the 3β-alkanoyloxy-17-cyano-5,16-androstadienes. The latter are contacted with a peroxy acid such as peroxyacetic, peroxypropionic, peroxybenzoic, peroxyphthalic acid to yield the 3β-alkanoyloxy-5α,6α-epoxy-17-cyano-16-androstenes of the structural formula

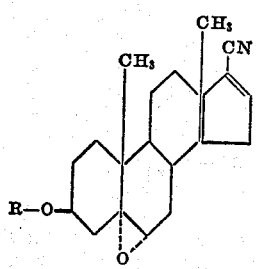

wherein R is an acyl radical derived from an alkanoic acid of less than 7 carbon atoms. Conventional hydrolysis yields the free 3-hydroxy compound.

Under Grignard conditions these compounds, and preferably the 3-alkanoyloxy derivatives depicted above, can be converted in good yields into the 3β,5α-dihydroxy-6β-methyl-16-pregnen-20-one by treatment with three molecular equivalents of methylmagnesium halide. Conventional solvents such as benzene and toluene give unsatisfactory results but more polar solvents and typically etheric solvents such as anisole, phenetole, or tetrahydrofuran give good yields for this multiple Grignard reaction.

Treatment of the 3β,5α-dihydroxy-6β-methyl-16-pregnen-20-one with alkaline hydrogen peroxide yields the corresponding 3β,5α-dihydroxy-6β-methyl-16α,17α-epoxypregnan-20-one of the structural formula

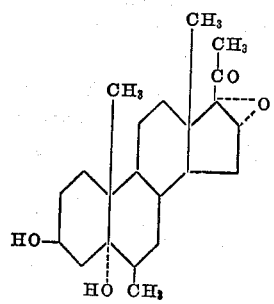

which is then oxidized with chromic acid to yield 5α-hydroxy-6β-methyl-16α,17α-epoxypregnane-3,20-dione. This compound can be dehydrated with thionyl chloride in pyridine to give 6β-methyl-16α,17α-epoxy-4-pregnene-3,20-dione. Isomerization of this compound is accomplished by refluxing it in toluene with aluminum isopropoxide to yield 6α-methyl-16α,17α-epoxy-4-pregnene-3,20-dione. This can then be converted to 6α-methyl-17-hydroxy-4-pregnene-3,20-dione by the addition of hydrogen bromide followed by debromination with Raney nickel. Acetylation yields the progestationally active 6α-methyl-17α-acetoxy-4-pregnene-3,20-dione.

The compounds which constitute this invention and the methods for their preparation will appear more fully from a consideration of the following examples, which are given for the purpose of illustration only and are not to be construed as limiting the invention in spirit or in scope. In these examples temperatures are expressed in degrees centigrade (° C.).

*Example 1*

To a mixture of 60 grams of 3β-acetoxy-5-androsten-17-one and 360 grams of potassium cyanide in 1600 grams of ethanol there are added slowly under stirring 380 grams of acetic acid. During the addition the temperature is maintained at about 10° C. The reaction mixture is then stirred for 1 hour at about 10° C. and for 2 additional hours at room temperature. Enough water is added to precipitate the cyanohydrin which is recovered by filtration. The 3β-acetoxy-17-cyano-17-hydroxy-5-androstene thus obtained decomposes at about 124° C. and has the specified rotation −93.3°.

A mixture of 60 grams of this crude cyanohydrin, 440 grams of pyridine and 44 grams of phosphorous oxychloride is refluxed for 8 hours. The solution is cooled and then poured under vigorous stirring into a cold solution of 500 grams of hydrochloric acid in 1500 grams of water. The mixture is then stirred for about 10 minutes. The precipitate is collected on a filter and washed first with dilute hydrochloric acid and then with water until neutral. It is then dissolved in acetone and boiled with activated charcoal, filtered, concentrated to a small volume, and cooled to yield a precipitate which is collected on a filter. The 3β-acetoxy-17-cyano-5,16-androstadiene thus obtained melts at about 208–211° C. and has a specific rotation of −71.6°.

A solution of 2 grams of 3β-acetoxy-17-cyano-5,16-androstadiene and 0.02 gram of potassium acetate in 18 grams of dichloromethane is treated with a mixture of 1.6 grams of 40% peroxyacetic acid, 2 grams of dichloromethane, and 0.08 gram of anhydrous potassium acetate while the temperature is maintained below 25° C. The entire mixture is then allowed to stand at room temperature for 4 hours, after which it is washed first with water, next with 5% sodium bicarbonate solution, and again with water until neutral, dried over anhydrous sodium sulfate, filtered, and evaporated almost to dryness. The residue is induced to crystallize by the addition of ether, collected on a filter and recrystallized from a mixture of dichloromethane and methanol to yield 3β-acetoxy-5α,6α-epoxy-17-cyano-16-androstene melting at about 191–194° C. $[\alpha]_D$ —64.7°. The 3β-propionoxy-5α,6α-epoxy-17-cyano-16-androstene is obtained by substituting an equivalent of 3β-propionoxy-5-androsten-17-one as the starting material.

Example 2

A mixture of 0.5 gram of sodium bicarbonate, 20 grams of water, and 160 grams of ethanol is refluxed with 0.5 gram of 3β-acetoxy-5α,6α-epoxy-17-cyano-16-androstene for 1 hour. The solution is concentrated to about ⅓ of its volume. The solution is poured into water, whereupon a precipitate is obtained which is collected by filtration and recrystallized from a mixture of acetone and ether.

The 3β-hydroxy-5α,6α-epoxy-17-cyano-16-androstene melts at about 211–213° C. and has the optical rotation —78.5° in chloroform solution.

Example 3

To 120 grams of a 3 molar solution of methylmagnesium bromide in ether are added dropwise under stirring 10 grams of 3β-acetoxy-5α,6α-epoxy-17-cyano-16-androstene dissolved in 75 grams of anisole. On a steam bath the mixture is heated for 5 hours at a temperature of 60° C. The mixture is cooled, transferred to a separatory funnel, and added very slowly under stirring to a mixture of 250 grams of acetic acid and 25 grams of water. The solution is then heated on a steam bath for about 30 minutes in order to distil off the ether-anisole mixture. The remaining anisole is steam distilled until approximately 1500 grams of water are collected in the distillate. The reaction mixture is cooled and then treated with a mixture of 120 grams of concentrated hydrochloric acid and 100 grams of water. The product is collected on a filter, washed with water, and recrystallized first from a mixture of chloroform and ether and then from methanol. The 3β,5α-dihydroxy-6β-methyl-16-pregnen-20-one thus obtained melts at about 253–256° C. and has the specific rotation +7.6°.

Example 4

To a solution of 1 gram of 3β,5α-dihydroxy-6β-methyl-16-pregnen-20-one in 50 grams of methanol are added 3.6 grams of 35% hydrogen peroxide and a solution of 0.36 gram of sodium hydroxide in 2 grams of water. The reaction mixture is maintained for 24 hours at room temperature. Enough water is added to precipitate all of the epoxide which is recovered by filtration. The 3β,5α-dihydroxy-6β-methyl-16α,17α-epoxypregnan-20-one melts at about 202–204° C. and has an optical rotation in chloroform solution of +22.2°.

Acylation of the 3β,5α-dihydroxy-6β-methyl-16α,17α-epoxypregnan-20-one with a slight excess of an alkanoic acid anhydride in pyridine gives the corresponding 3β-acyloxy-5α-hydroxy-6β-methyl-16α,17α-epoxypregnan-20-one. The 3β-acetoxy derivative melts at about 210–213° C. and has an optical rotation in chloroform solution of +25°.

Example 5

A solution of 0.5 gram of 3β,5α-dihydroxy-6β-methyl-16α,17α-epoxy-pregnan-20-one in 9 grams of acetic acid is treated with a solution of 0.16 gram of chromic oxide in a mixture of 0.7 gram of acetic acid and 0.7 gram of water. The mixture is stirred at about 45–48° C. for 90 minutes. A small amount of methanol is added to destroy the excess of chromic acid. Stirring is continued for 10 minutes and the solvent is removed under vacuum. Water is added to the residue in order to crystallize the product which is then collected on a filter and recrystallized from a mixture of dichloromethane and ether. The 5α-hydroxy-6β-methyl-16α,17α-epoxypregnane-3,20-dione melts at about 248–250° C. and has an optical rotation in chloroform solution of +51°.

Example 6

A solution of 0.5 gram of 5α-hydroxy-6β-methyl-16α,17α-epoxypregnane-3,20-dione in 6.3 grams of pyridine is treated at about 0° C. with 0.62 gram of thionyl chloride for 10 minutes. The reaction mixture is diluted with ice-water and the product is collected on a filter and recrystallized from a mixture of chloroform and ether. The 6β-methyl-16α,17α-epoxy-4-pregnene-3,20-dione melts at about 175–182° C. and has the optical rotation +108° in chloroform solution.

A mixture of 1 gram of 6β-methyl-16α,17α-epoxy-4-pregnene-3,20-dione and 2 grams of aluminum isopropoxide in 100 grams of toluene is refluxed for 25 minutes. Then sodium potassium tartrate solution is added to the mixture and it is extracted with ether. Evaporation of the ether under vacuum yields a residue which is recrystallized from a mixture of acetone and hexane and then purified by chromatography over alumina. The 6α-methyl-16α,17α-epoxy-4-pregnene-3,20-dione thus obtained melts at about 148–154° C.

Example 7

A solution of 6α-methyl-16α,17α-epoxy-4-pregnene-3,20-dione in acetic acid is treated with an excess of dry hydrogen bromide gas. The reaction mixture is allowed to stand at room temperature for about 30 minutes. The mixture is poured into ice-water and the bromohydrin is recovered by filtration. The dry bromohydrin is refluxed for 2 hours in a methanol solution with twice its weight of Raney nickel. The Raney nickel is removed by filtration, and the methanol solution is evaporated almost to dryness. The solution is then cooled and the resulting precipitate is recrystallized from acetone to yield 6α-methyl-17α-hydroxy-4-pregnene-3,20-dione melting at about 218–220° C. This compound is acetylated by treatment with a mixture of acetic anhydride and acetic acid in the presence of p-toluenesulfonic acid.

What is claimed is:
1. A compound of the structural formula

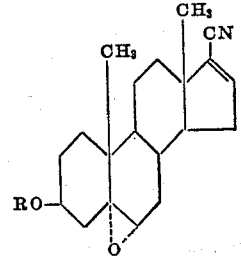

wherein R is a member of the class consisting of hydrogen and acyl radicals derived from alkanoic acids of less than 7 carbon atoms.

2. 3β-hydroxy-5α,6α-epoxy-17-cyano-16-androstene.
3. 3β-acetoxy-5α,6α-epoxy-17-cyano-16-androstene.
4. 3β,5α-dihydroxy-6β-methyl-16-pregnen-20-one.
5. 3β,5α-dihydroxy-6β-methyl-16α,17α-epoxy-pregnan-20-one.
6. 5α-hydroxy-6β-methyl-16α,17α-epoxypregnane-3,20-dione.

References Cited in the file of this patent
UNITED STATES PATENTS

| 2,555,704 | Ruzicka et al. | June 5, 1951 |
| 2,751,381 | Slomp | June 19, 1956 |
| 2,873,273 | Ruggieri et al. | Feb. 10, 1959 |

OTHER REFERENCES

Spero et al., 78 J.A.C.S. 6213 (1956).